United States Patent [19]
Browning

[11] Patent Number: 4,951,150
[45] Date of Patent: Aug. 21, 1990

[54] OPTICAL PROJECTION SYSTEM

[75] Inventor: Iben Browning, Sandia Park, N. Mex.

[73] Assignee: Foresight, Inc., Albuquerque, N. Mex.

[21] Appl. No.: 317,429

[22] Filed: Mar. 1, 1989

[51] Int. Cl.$^5$ .............................................. H04N 5/74
[52] U.S. Cl. ...................................... 358/231; 358/60; 358/236; 350/353; 350/359
[58] Field of Search ............... 358/231, 232, 235, 236, 358/60; 350/353, 359, 600

[56] References Cited

U.S. PATENT DOCUMENTS

| | | | |
|---|---|---|---|
| 4,006,383 | 2/1977 | Luo et al. | 315/169.1 |
| 4,592,628 | 6/1986 | Altman et al. | 358/60 X |
| 4,611,245 | 9/1986 | Trias | 358/231 X |
| 4,710,732 | 12/1987 | Hornbeck | 358/231 X |
| 4,720,747 | 1/1988 | Crowley | 358/231 |
| 4,744,646 | 5/1988 | Haven et al. | 350/331 R |
| 4,755,869 | 7/1988 | Tanaka | 358/60 |
| 4,765,717 | 8/1988 | Buzak et al. | 350/331 R |
| 4,769,712 | 9/1988 | Polaert | 358/231 |
| 4,818,983 | 4/1989 | Hara et al. | 358/236 X |
| 4,838,651 | 6/1989 | Pottharst et al. | 358/236 X |

OTHER PUBLICATIONS

Peercy, et al., "Photographic Image Storage in Ion Implanted PLZT Ceramics", *Nuclear Instruments and Methods*, vol. 209-210 (1983) pp. 1167-1178.

Haertline, et al., "Hot-Pressed (Pb,La)(Zr,Ti)O$_3$ Ferroelectric Ceramics for Electrooptic Applications", *Journal of the American Ceramic Society*, vol. 54, No. 1, Jun. 1971, pp. 1-11.

Guk, et al., "Investigation of Controlled Transparency Arrays Made of PLZT Ferroelectric Ceramics", *Sov. Journal of Quantum Electron*, vol. 12, No. 7, Jul. 1982, pp. 968-970.

Matsunami, et al., "Preparation of Ferroelectric PLZT Thin Films", *Journal of Electronic Materials*, vol. 7, No. 2, 1978, pp. 229-235.

Adachi, et al., "Electro-Optic Effects of (Pb,La)(Zr,Ti)O$_3$ Thin Films Prepared by RF Planar Magnetron Sputtering", *Applied Physics Letter*, vol. 42, No. 10, May 15, 1983, pp. 867-868.

Sakuma, et al., "A New Operating Method for PLZT Display Devices", *Japanese Journal of Applied Physics*, vol. 14, No. 11, (1975), pp. 1845-1846.

(List continued on next page.)

*Primary Examiner*—James J. Groody
*Assistant Examiner*—Mark R. Powell
*Attorney, Agent, or Firm*—Welsh & Katz, Ltd.

[57] ABSTRACT

An optical projection system which in one implementation reflects illumination from a source off of an electro-optic imaging member in the shape of a plate. The imaging member in the preferred embodiment is an electro-optic ceramic plate, such as PLZT, which is substantially transparent to visible light when not affected by an electric field or electron beam. The imaging member is bonded to the front face-plate of a cathode-ray tube which includes an electron beam generator, a controller for modulatng the intensity of the electron beam with an image and a raster scan generator for scanning the beam across the front face of the tube. At spots where the electron beam strikes the electro-optic plate, the opalescence of the spot is changed in accordance with the scattering effect of the crystal and in dependence upon the intensity of the beam thereby writing a physical nonvolatile image in the imaging member. The imaging member has a transparent electrode on its front face, and an opposing electrode on the back face of the plate. The electrode on the back face of the plate is formed of a multiplicity of strip-like elements which are arranged in substantially parallel rows in the form of a raster. The strip-like elements are mirrored to reflect the illumination of the source and transparent to the electron beam to allow writing of the image in the imaging material. The image formed in areas of the plate is remanent until erased. The application of a voltage between the face electrode and one of the back electrode elements erases the image written by the electron beam scannings for that particular strip.

17 Claims, 10 Drawing Sheets

OTHER PUBLICATIONS

Tanaka, et al., "Ferroelectric PLZT Thin Films Fabricated by RF Sputtering", *Japanese Journal of Applied Physics*, vol. 15, No. 7, (1976), pp. 1381–1382.

Nagawa, et al., "Ferroelectric Properties of RF Sputtered PLZT Thin Film", *Japanese Journal of Applied Physics*, vol. 18, No. 5, May 1979, pp. 897–902.

Harris Jr., et al., "Electrode Slotting Process for Thin PLZT Wafers", *Ferroelectrics*, 1980, vol. 27, pp. 191–194.

Holz, et al., "Preparation, Properties and Application of Thin Ferroelectric Films of PLZT", *Ferroelectrics*, 1984, vol. 56, pp. 161–164.

Holz, et al., "Preparation and Properties of Thin Ferroelectric Films of PLZT", *Ferroelectrics*, 1983, vol. 51, pp. 87–92.

Vest, et al., "Preparation and Properties of PLZT Films from Mettalo-Organic Precursors", *Ferroelectrics*, 1989, vol. 93, pp. 21–29.

Kahlilov, et al., "Electroconductivity in PLZT", pp. 60, 62–65.

Haertling, "PLZT Electrooptic Materials and Applications—A Review", *Ferroelectrics*, 1987, vol. 75, pp. 25–55.

Lindberg, "Solid Crystal Modulates Light Beams", pp. 204–205.

Luo, et al., "Design and Fabrication of Large-Area Thin-Film Transistor Matrix Circuits for Flat-Display Pannels", *IEEE Transactions on Electron Devices*, vol. ED-27, No. 1, Jan. 1980, pp. 223–230.

Pulvari, et al., "Light-Beam Modulation", Dept. of Electrical Engineering, Catholic University of America, Washington, D.C., pp. 357–358.

Kohashi, et al., "EL-PC Image Intesifier" (Breakthrough in Light Amplifiers), Matsushita Research Institute, Tokyo, Inc., Ikuta, Kawasaki, Japan, pp. 182 ∝ 186.

Land, et al., "A Review of the Effects of Ion Implantation on the Photoferroelectric Properties of PLZT Ceramics", Ferroelectrics, 1982, vol. 45, pp. 25–43.

Land, "Photosensitivity and Imaging Characteristics of Ion-Implanted PLZT Ceramics", *Proceedings of the Sixth International Meeting of Ferroelectricity*, Kobe 1985 and *Japanese Journal of Applied Physics*, vol. 24 (1985) Supplement 24–2, pp. 134–138.

Haertling, "Electro-Optic Ceramics and Devices", *Electronic Ceramics, Properties Devices, and Applications*, Chapter 7, pp. 371–492, Marcel Dekker, Inc., 1988.

Smith, et al., "Scattering-Mode Ferroelectric-Photoconductor Image Storage and Display Devices", *Appl. Phys. Lett.*, vol. 20, No. 4, Feb. 1972, pp. 169, 171.

Wu, et al., "Transient Switching Response and Partial Switching Phenomena in Coarse-Grained Rhombohedral-Phase PLZT Ceramics", *Ferroelectrics*, 1976, Vo. 10, pp. 43–46.

Kumada, et al., "Display Applications of Field-Enforced Phase Transition in PLTZ Ceramics", *Ferroelectrics*, 1976, vol. 10, pp. 25–28.

Himuro, et al., "A Color Viewfinder Using PLTZ Light Shutters and a B/W CRT", 7 pages.

Marie, "Light Valves Using DKDP Operated Near its Curie Point: Titus and Phototitus" Ferroelectrics, 1976 vol. 10, pp. 9–14.

Maldonado, et al., "PLZT Ceramic Display Devices for Slow-Scan Graphic Projection Displays", *Proceedings of the IEEE*, vol. 61, No. 7, Jul. 1973 pp.975–981.

Bye, "High Birefringence PLZT Materials for Low Voltage Displays", *Ferroelectrics*, 1976 vol. 10, pp. 29–33.

Carl, et al., "Dielectric and Optical Properties of a Quasi-Ferroelectric PLTZ Ceramic", *Proceedings of the IEE*, vol. 61, No. 7, Jul. 1973, pp. 967–974.

Wolfram, "Switching Characteristics and Speeds of PLZT-Ceramics and their Effect on Optical Device Applications", *Ferroelectrics*, vol. 10, 39–42.

Dimza, et al., "Induced Absorption in Electrooptical PLZT Ceramics and $SrTiO_3$ Crystal with Electron Pulse Irradiation", *Ferroelectrics*, 1986, vol. 69, pp. 105–109.

Shermergor, et al., "Scattering of Electromagnetic Waves in Ferroelectric Ceramics", *Ferroelectrics*, 1986, vol. 69, pp. 43–49.

Khalilov, et al., "Asymmetry of Electroconductivity in Polarized PLZT Ceramics", *Ferroelectrics*, 1986, vol. 69, pp. 59–65.

"PLTZ Ceramics", Lab News, vol. 38, No. 13, Sandia National Laboratories, Jul. 3, 1986, 10 pages.

"'Photography' in Ceramics Developed at Sandia Labs", *Albuquerque Journal*, Jan. 24, 1972.

"Electro-Optic 'Ceramic' Creates Contrasty, High Resolution Images", *Sandia Science News*, Sandia Laboratories, vol. 7, No. 1, Mar., 1972.

Schueler, et al., "Electron-Beam Addressed Ferroelectric Ceramic Display Services", Record of Invention and Disclosure SD-2710, Sandia Laboratories, Sep. 29, 1972.

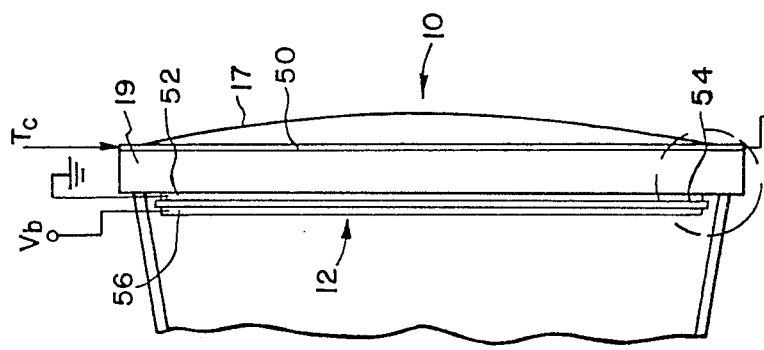
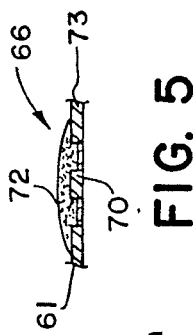
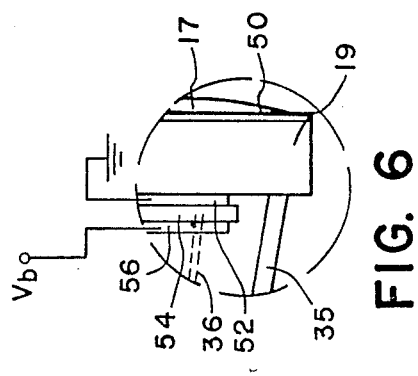
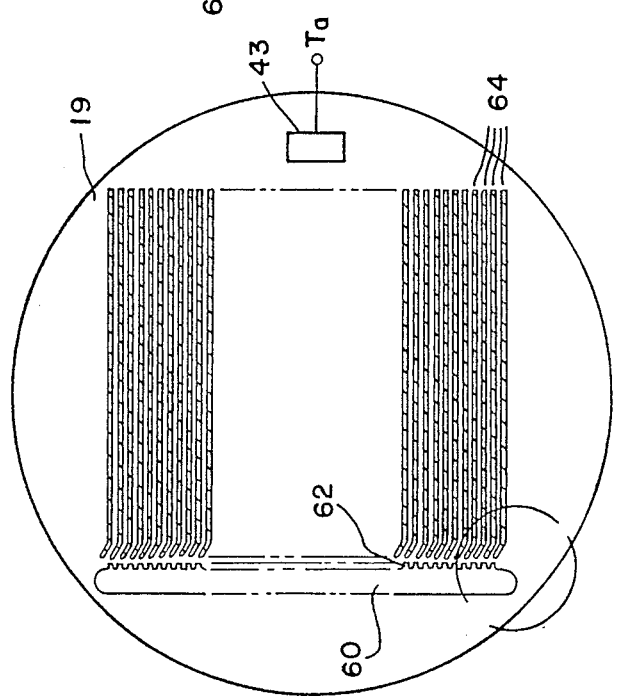
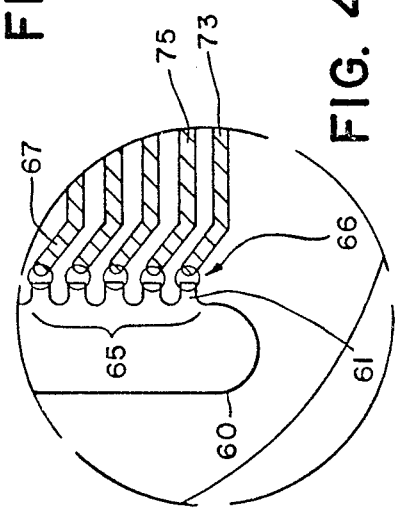

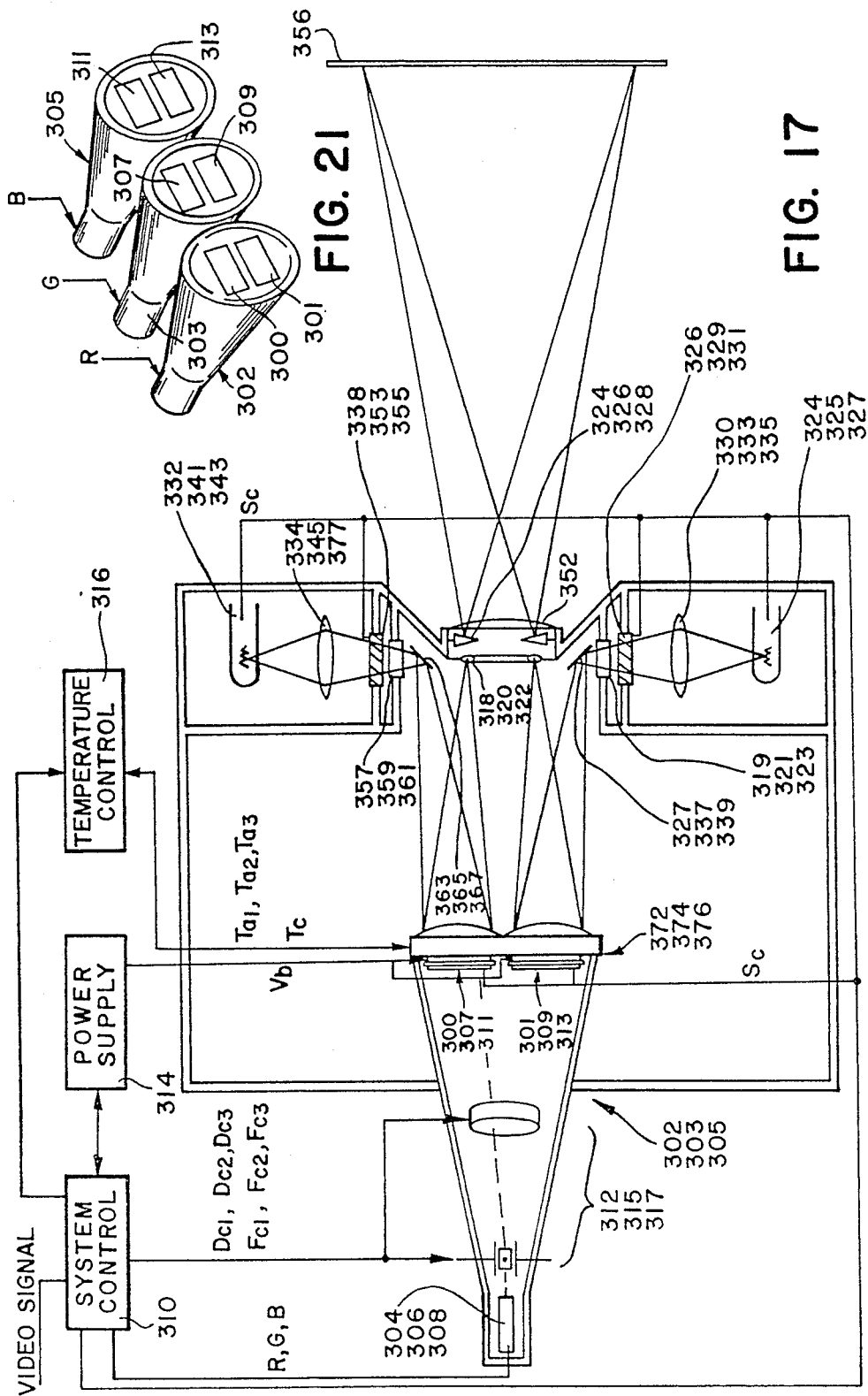

OPTICAL PROJECTION SYSTEM

FIELD OF THE INVENTION

The invention pertains generally to optical projection systems and more particularly to such projection systems which use an electro-optic element for an image storage medium.

BACKGROUND OF THE INVENTION

In conventional video systems such as television, a video image is produced by scanning an electron beam in a raster format across the face of a tube having phosphors which glow with either a white light or color, depending upon the system. Because the phosphors only glow for a predetermined amount of time, the images are relatively volatile and must be frequently rewritten.

In the most common example, an NTSC television format includes a raster scan of 525 horizontal lines per video frame. To give the illusion of a single image, many of these frames are combined sequentially in time thereby allowing the eye to integrate the combination and perceive moving images on a screen. Usually, the frame rate is 30 frames per second, with two interlaced fields forming a frame. The interlace technique, where one half of the 525 horizontal lines is shown in one field followed by the other half of the horizontal lines in the next field, is to reduce the phenomenon of flicker. Flicker is caused by the on/off nature of the video signals and produces an annoying artifact at the field frequency.

It is known that increasing the frame rate will reduce the perception of flicker, but such requires additional bandwidth to transmit the signal and additional equipment to decode and display the video signals. It is known that much of the bandwidth of a television signal, as much as 60%, is required for this flicker fusion due to the high repetition frame rate.

The phenomenon of flicker is also noted in optical projection systems which are used in commercial movies. For example, a standard movie projector displays 24 frames of a film per second, and these frames in turn are each transilluminated three times. This system, therefore, gives 72 flickered images per second to maintain flicker fusion.

An image which did not flicker would eliminate these high speed repetitive showings of the image because there would be no need for flicker fusion. Much of the time, the image shown in a video environment does not change from frame to frame. It is only when an element of the image is moving does the frame itself change. However, the frame rate of motion fusion is much less than flicker fusion. The motion fusion rate can be as low as 11 frames per second, and thus a system which imaged without flicker could be designed to operate at this lower repetition rate. This would reduce the bandwidth for transmitting video signals with present signal formats by as much as 60%. However, a flickerless video system envisions a nonvolatile screen display other than the present phosphor display screens.

The video technology is advancing to where large screen optical projection systems are rivaling commercial movie theaters. These large screen optical projection systems are more common today and generally include a video monitor with a projection system to receive an image from a cathode ray tube screen and to magnify it by optical means onto a larger screen. However, these system are today somewhat limited in final screen size because of cost and efficiency. To build a cathode ray tube for the initial image which is bright enough, or with enough image definition, to permit significant magnification without substantial reduction in image quality is extremely difficult and expensive. Further, the conventional cathode ray tube is inherently inefficient for such projection because of the way the image is formed. The phosphors of a cathode ray tube screen emit scattered, incoherent light. It is difficult to capture much of the energy from this type of image for projection, which creates a consequent reduction in the brightness of the final image. There is presently no relatively inexpensive optical projection system for projecting a video image from a cathode ray tube screen to movie screen size.

However, the distribution of video images and their initial formation are much easier with cathode ray tube technology than with the image medium of film. The distribution of video images by means of over-the-air transmission, video disk or cassette is well developed and the technology is highly efficient. The imaging of a cathode ray tube screen where monochrome or color images can be made by a raster scan of phosphors on the display screen of the tube is also relatively efficient and much more effective than transmitting illumination through a celluloid based film. The production of video programs on film requires a complex distribution system and creation process. It is much easier to make, combine and edit a video tape or disk than it is to perform the same operations for a film of comparable duration. Moreover, video special effects can be more easily incorporated into video tape or disk than on film.

Therefore, it would be highly desireable to provide an optical projection system which incorporates the efficient video technology of the cathode ray tube while replacing the inefficient projection and magnification technology of the phosphor screen display. It would also be highly desirable if such optical projection system included a display screen which was nonvolatile to allow such system to operate at the motion fusion rate without flicker.

An image medium which possesses many desirable optical characteristics for these purposes are electro-optic materials. Electro-optic materials provide a medium by which electrical information can be transformed into optical information or by which optical functions can be performed upon command from an electrical signal. These electro-optic materials are typically single crystals, such as KDP, $LiNbO_3$, $LiTaO_3$, and SBN or even liquid crystals.

Electro-optic ceramics, particularly including PLZT, $Pb_x La_y (Zr_zTi)O_3$, are one of the newest classes of electro-optic materials finding increasing use in such applications as optical shutters, modulators, displays, color filters, image storage devices, and linear gate arrays for optical processing. Their success in these applications thus far has been largely due to a number of factors, including (1) high optical transparency, (2) high electro-optic coefficients, (3) fast response time, (4) high electrical resistivity, (5) direct current (DC) operation, (6) low power consumption, (7) memory capability, (8) good property uniformity over large areas, (9) moisture insensitivity, and (10) low cost. Foremost among these characteristics is high optical transparency since many of the other properties cannot be effectively utilized in electro-optic devices unless the material is capable of transmitting a large portion of the incident light. (See Haertling, G., Chap. 7, Electro-optic Ceramics and Devices in Electronic Ceramics, Ed. Levinson, Marcel Decker, Inc., 1988).

SUMMARY OF THE INVENTION

Therefore, it is an object of the invention to provide an improved optical projection system.

It is another object of the invention to provide an improved optical projection system which uses a nonvolatile but erasable imaging member of the electro-optic type.

It is yet another object of the invention to provide an optical projection system for television type video formats which does not contain flicker.

Still another object of the invention is to provide an improved optical projection system for color images.

A further object of the invention is to provide an improved optical projection system having a transmissive electro-optic imaging member.

A still further object of the invention is to provide an improved optical projection system having a reflective electro-optic imaging member.

According to one embodiment of the invention, a monochromatic optical projection system includes an electro-optic imaging member generally in the shape of a plate or screen. An illumination source is provided which produces visible illumination that can either be reflected off of the imaging member or transmitted though it. The image bearing member forms an image by varying the opalescence of various areas of the member when irradiated by a source of visible illumination.

In the illustrated implementation, the imaging member forms the front face of a cathode-ray tube and is an electro-optic ceramic, PLZT (lead-lanthanum-zirconate-titanate), plate which is substantially transparent when not affected by an electric field or an electron beam. The cathode-ray tube includes an electron beam generator, a controller for modulating the intensity of the electron beam and a scan generator for scanning the beam across the front face of the tube, thereby producing an image. At spots where the electron beam strikes the PLZT plate, the opalescence of the spot is changed in accordance with the scattering effect of the PLZT crystal and in dependence upon the intensity of the beam thereby writing a pixel of an image in the plate. The imaging member has a transparent electrode on the front face of the plate and an opposing electrode on the back face of the plate.

In one configuration, the electrode on the back face of the plate is formed of a multiplicity of strip like elements which are arranged in substantially parallel rows to form the corresponding horizontal lines of a raster. The strip-like elements are mirrored on one side to reflect the illumination of the source and are at least partially transparent to the electron beam to allow writing of the image. The image formed in the domains of the imaging member is nonvolatile until erased. The application of voltage between the front face electrode and one of the back electrode elements erases the image written by the electron beam for that particular strip or horizontal line.

In operation, an image is written on the imaging member and displayed by illuminating the plate with visible radiation from a source. The reflection of the source illumination is modulated by the stored image thereby projecting the image for display. The image can be changed a line at a time by first erasing a horizontal line with a selected strip like element and then by rewriting the blank line with the electron beam. Projection optics receive the reflected image and magnify the image for projection onto a display screen.

The invention further contemplates an imaging member which in its quiescent state is opalescent and becomes transparent upon being written with the electron beam. Moreover, the imaging member can be written with the electrodes and erased with the electron beam or, conversely, written and erased with only one of the groups comprising the electron beam and the electrodes.

In accordance with a second embodiment of the invention, two PLZT imaging members, forming separate imaging areas of generally similar dimensions, are written with the electron beam of a cathode-ray tube as in the previous embodiment. Both imaging areas have full front and back electrodes which are adapted to erase the images written thereon entirely. Dual illumination sources and projection optics overlay in registration on a display screen an image from one imaging area with the image from the other imaging area. The illumination of the imaging areas can be either reflective or transmissive as with the first embodiment.

Disposed between the illumination sources and the first and second image areas of the imaging member are first and second optical gates which can be made selectively transparent and opalescent. When the first optical gate is made transparent, the image of the first image area is projected onto the display screen and vice versa for the image controlled by the second optical gate. By alternating the transparency and opalescence of the first and second optical gates, the images can be alternately displayed. In this manner, one image can be fully erased and rewritten while the other is being shown. The alternation frequency can be at the motion fusion rate which reduces the transmission bandwidth for a video signal. The alternating images are nonvolatile and overlap thereby preventing flicker. This embodiment provides an alternative to the line by line erase implementation of the first embodiment.

In accordance with a third embodiment of the invention, an optical imaging system of the type described for the first embodiment, but providing a color image, is illustrated. The system comprises a plurality of cathode-ray tubes with imaging members of PLZT similar in construction to those of the first embodiment. Preferably, imaging members form three separate imaging areas which correspond to the three primary color guns of the cathode-ray tubes. Each color gun writes a primary color image to a respective imaging member which is a part of the total image. Each of the images is illuminated, either transmissively or reflectively, by separate illumination sources after being focused through associated dichroic filters which provide monochromatic illumination for the separate imaging areas. These three separate monochromatic images can then be combined into one composite color image which is projected onto a display screen. The structure of the imaging member for each imaging area is that of the line-by-line erase implementation as previously discussed for the first preferred embodiment.

In accordance with a fourth embodiment of the invention, the second and third embodiments may be combined to yield a full erase, color optical projection system. Three cathode-ray tubes having three primary color guns respectively, separately image three imaging areas on a first level of three imaging members, and alternately image three separate imaging areas on a second level of the imaging plates. The first level and second level are alternately illuminated, either transmissively or reflectively, by separate illumination sources. Each illumination source is projected through a dichroic filter and an optical window which alternates between transparency and opalescence. The three separate images of the first level comprise one color image when combined and the three separate images of the second level comprise the same color image when combined. Each imaging member has a full back electrode on the first level and a full back electrode on the second level to completely erase each level after the other has been rewritten. This provides a full erase, color optical projection system without flicker.

Therefore, an optical projection system yielding the aforementioned objects has been illustrated by the four preferred implementations. The important aspect of the invention related to increased efficiency and brightness in the display is provided by an electro-optic material having a high transparency for either efficient reflection or transmission of the source illumination. Particularly, but not exclusively, the use of the electro-optic ceramic, PLZT, in its scattering mode provides a bright undistorted image from which much of the illumination energy can be captured for projection and magnification.

In addition, the nonvolatility of an electro-optic medium allows a frame repetition at the motion fusion rate while the erasure mechanism, either line-by-line or full erase, and the writing mechanism, electron beam, provides a facile means for varying the image in a nonvolatile medium. The cathode-ray tube can be operated at a lower voltage with much simpler deflection electronics because an electro-optic medium does not require the high energy electron beam and the large deflection angles of a phosphor screen tube. The projection system of the invention, thus, significantly reduces the complexity of conventional cathode-ray tube structures with corresponding benefits in manufacturing ease and longevity of use.

Because of the flexibility of writing, erasing, and projecting the images in the basic system, the color implementations can be advantageously formed by the elegant simplicity of additive primary color combination.

BRIEF DESCRIPTION OF THE DRAWINGS

These and other objects, features and aspects of the invention will be better understood and more fully described upon a reading of the following detailed description in conjunction with the appended drawings wherein:

FIG. 2 is an enlarged cross-sectional view of the imaging member of the optical projection system illustrated in FIG. 1;

FIG. 3 is a back view of the imaging member illustrated in FIG. 2;

FIG. 4 is an enlarged fragmented view of the circled area of the imaging member illustrated in FIG. 3;

FIG. 5 is an enlarged cross-sectional view of one of the phosphor dots illustrated in FIG. 4;

FIG. 6 is an enlarged fragmented cross-sectional view of the circled area of FIG. 2;

FIG. 17 is a system block diagram of a reflective implementation of a fourth preferred embodiment of an optical projection system constructed in accordance with the invention;

FIG. 21 is a perspective view of the cathode ray tubes of the optical projection system illustrated in FIG. 17.

DETAILED DESCRIPTION OF THE PREFERRED EMBODIMENTS

Figure 1:
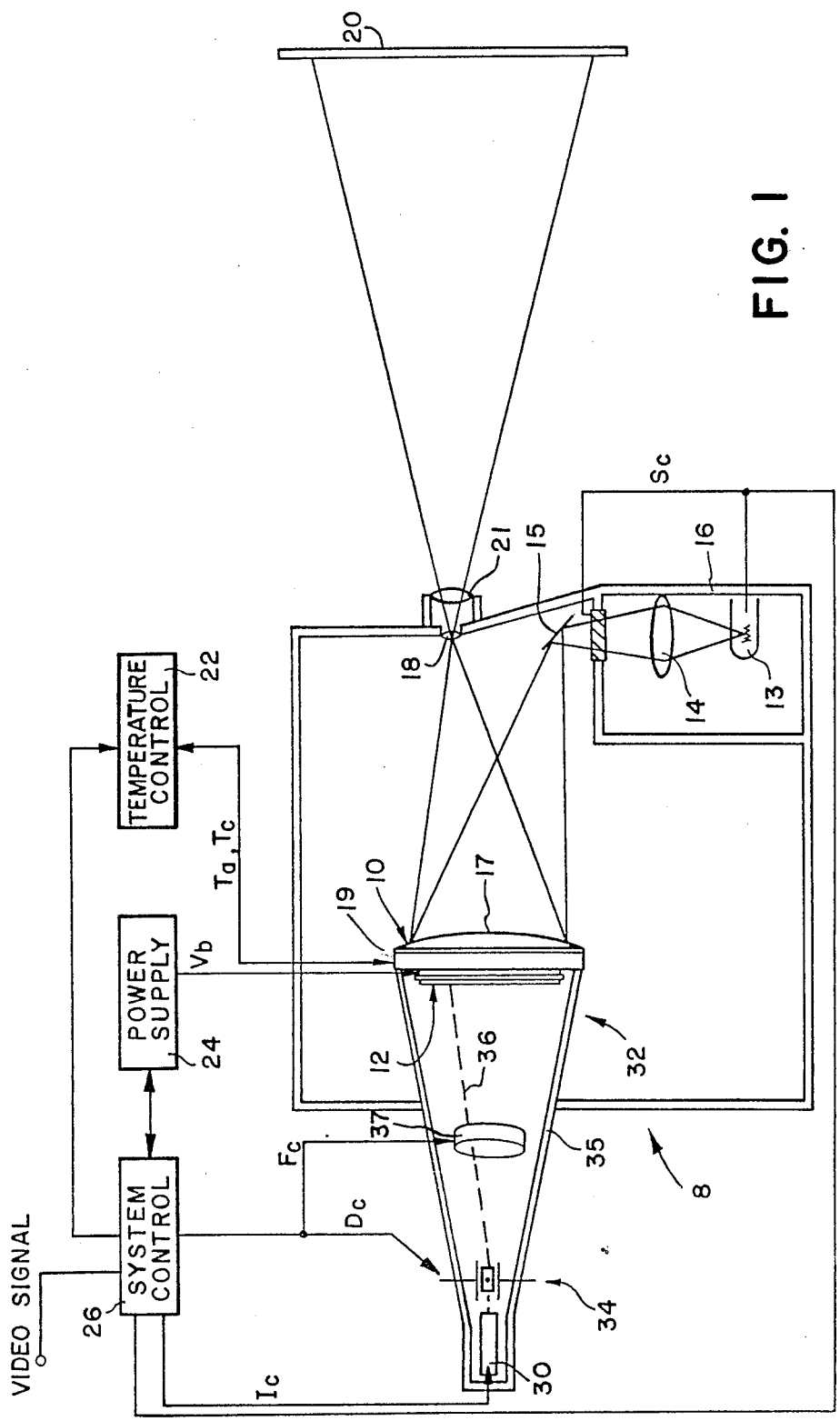
FIG. 1 is a cross-sectional system block diagram of a reflective implementation of a first preferred embodiment of an optical projection system constructed in accordance with the invention.

With reference now to FIG. 1, there is shown an optical projection system 8 constructed in accordance with the invention. The preferred embodiment illustrated is a monochromatic reflection implementation and includes an imaging assembly 10 having an image stored therein in a nonvolatile manner. The image is in the form of various patterns of opalescence in an electro-optic medium and its formation will be more fully described hereinafter. The back (left side) of the imaging assembly 10 includes an imaging member 12 flexibly bonded thereon which has a mirror surface. When irradiated with illumination from a source 13, the imaging member 12 reflects the light and forms an image by scattering the light according to the physical image modulation stored in the member.

The illumination source 13 can take the form of many types of radiation sources but preferably, for an image in the visible spectrum, a conventional high wattage projection bulb of the Xenon type is used. This type of illumination source produces an intense white light that can be easily modulated by the imaging member 12. The illumination from the source 13 is focused on a mirror 15 by a generally convex condensing lens 14 which focuses the image of the light source on the mirror surface of the imaging member 12.

In operation, the radiation from the source 13 is condensed and then reflected by the mirror 15 to the back of imaging member 12 via field lens 17 and optical flat 19. The light is reflected off the back of the imaging member 12 and is modulated by the image by being scattered in accordance with the variations of the physical image areas therein. The modulated image is focused onto a collecting lens 18 and thereafter passes through projection lens 21 which is at its focal length from, and projects upon a display screen 20. Lenses 17 and 18 are at their focal length from each other so that the reflected light from imaging member 12 emits parallel light from lens 18.

The projection system 8 is enclosed in a housing 16 which retains the light which is scattered and not collected by lens 18. The imaging member 12 produces two images by modulation of the reflected illumination, one a scattered image of the physical modulation of the stored image and the other, a specular image, which is a negative of the scattered image. While either image could be collected and projected, preferably the specular image is utilized because substantially all of the energy in that image can be collected and projected by inexpensive optics.

The imaging member 12 is attached flexibly to the optical flat 19 which forms the face plate of a cathode-ray tube 32 having a vacuum envelope 35. The cathode-ray tube 32 has a means, electron gun 30, for generating an electron beam 36 which strikes the imaging member 12.

A system control 26 modulates the intensity of the electron beam 36 by means of an image control signal Ic. The image signal contains image information obtained in a conventional manner from an input video signal. The system control 26 additionally provides a means for scanning the beam 36 across on the imaging member 12. Preferably, this is implemented by conventional x-y deflection plates 34 and a focusing ring 37 which are regulated by a deflection control signal Dc and a focus control signal Fc.

The system control 26 provides control for a power supply 24 and temperature control 22 for the imaging assembly 10. The power supply 24 provides a DC bias voltage Vb across the imaging member 12 in particular image areas where electrode patterns have been placed for selective erasure. The temperature control 22 is provided to control the temperature of the imaging member 12 to an operating point where the electron beam 36 can write an image and the bias voltage Vb can erase it.

The temperature controller 22 receives a signal Ta indicative of the actual temperature of the imaging member 12 from a temperature sensor 43 (FIG. 3) affixed to the back of the optical flat 19. The temperature controller 22 regulates the temperature by varying a current signal Tc supplied to a resistive heating element 50 on the front face of the optical flat 19. Because the optical flat 19 is relatively large compared to the imaging member 12 and made of a substantially insulative material (glass) which does not gain or lose temperature quickly, it acts as a heat sink and maintains the imaging member 12 at a substantially constant temperature.

The imaging member 12 will now be more fully described with respect to FIGS. 2–5. In FIG. 2, an enlarged cross-sectional side view of the imaging assembly 10 of FIG. 1 illustrates its structure. The imaging assembly 10 comprises from front to back (right to left as shown in the drawing) the field lens 17, a transparent resistive heating electrode 50, the optical-flat 19, and the imaging member 12. The imaging member 12 comprises a transparent front electrode 52, an imaging plate 54, and a back electrode 56. The back electrode 56 is reflective or mirror-like on the side facing the imaging plate 54 and at least partially transparent to the electron beam 36 from the other side. The front and back electrodes 52, 56 cover substantially the entire surfaces of the imaging plate 54 and form between them an imaging area.

The imaging plate 54 is formed from an electro-optic material, preferably ceramic PLZT, and is extremely thin, approximately 5–10 mills, when compared to the optical-flat 19 which is transparent and operates as a structural support for the imaging member 12. The imaging members are attached to the optical-flats by flexible bonding. When imaged or erased, the polarization of the grain domains in the electro-optic material causes a change in their physical dimensions, thus producing stress in the material. If not flexibly bonded, these cyclic stresses could in time cause mechanical failure of the material. There are known techniques in the prior art for the flexible bonding of electro-optic materials to surfaces to prevent such failures and any can be used. These stresses in the electro-optic material because of grain domain polarization increase with thickness, which is the reason for the use of very thin imaging plates. Both of these techniques are used in the present implementations to increase the longevity of the imaging members of the optical projection system.

In general, the temperature of the imaging plate 54 is regulated by the temperature control 22 to a condition where the material is transparent. The electron beam varies this transparent condition at spots (pixels) where it strikes the imaging member 12 by forming charge areas in back electrodes 56 with consequent localized electric fields which reorient the charges of the grain domains in the plate 54 to provide various degrees of opalescence. The rotation of the domains and amount of image variation is proportional to the intensity of the beam and the localized field.

By opalescent the application describes the degree by which light is scattered by the grain domains of the imaging member. The term is used whether the light is transmitted through the member or reflected back through the member. When the PLZT or other electro-optic material is in its transparent state, there is little or negligible scattering and absorption of the illumination. When the material is in its opalescent state, there is a maximum scattering of the illumination, though not 100%, and still negligible absorption. Varying degrees of the opalescent state can be formed by varying the polarization of the grain domains from the minimum scattering state to the maximum scattering state within the bounds of the material characteristics. The bounds of these states are variable to some degree by the variance of other parameters such as material composition, operating temperature, residual domain stress, bias fields, etc.

The bias voltage Vb of the power supply which is on the order of +300–600 D.C. volts supplies a sufficient reverse bias voltage to rotate the domain polarity back to where the material is transparent. This phenomenon thereby permits the storing of image in the imaging member 12 by writing it with the electron beam and then by selectively erasing the written image with the bias voltage. The front electrode 54 is preferably maintained at relative ground potential to accelerate the elections from gun 30 toward the imaging plate. Because the electro-optic material can be written with lower energy electrons, the deflection and focusing means are less complex than conventional phosphor screen cathode-ray tubes. The simple construction of the cathode-ray tube lends itself to inexpensive manufacturing processes and increased useful lifetime.

FIG. 3 illustrates a preferred electrode configuration for the back electrode 56 in the present implementation. The configuration has a common electrode pattern 60, either placed vertically or horizontally, imprinted on the surface of the imaging plate 54 with a multiplicity of strip-like finger projections 62 facing outwardly. Each of the finger projections 62 is associated with one of a multiplicity of elongated strip-like elements 64 which transverse the distance from the common pattern 60 to the edge of the imaging area of the imaging plate 54.

The strip-like elements 64 are connected electrically to associated finger projections 62 by a switching elements 65, in a single example, the referenced elements 61, 66, 73 (FIG. 4). The switching elements 65 are used to selectively connect the strip-like elements to the common pattern and thus to its potential. In this manner, any of the strip-like elements 64 is independently switchable between a no voltage potential and the potential of the common pattern 60.

Advantageously, the switching elements 65 can be remotely controlled by the electron beam 36 of the cathode-ray tube 32. As better seen in FIG. 5, the switching element 66 comprises a photo-conductive strip 70 connecting the finger projection 61 to its associated strip-like element 73. Each connection is covered by a very fast decay phosphor dot 72 which radiates when struck with the high energy electrons from the electron beam 36. Normally, the strip-like element 73 is at a zero potential because the photoconductive strip 70 is in its nonconductive state. However, when the electron beam 36 of the cathode-ray tube 32 is scanned over the phosphor spot 72, the phosphor spot emits radiation and switches the photoconductive strip 70 to its active state thereby connecting the strip-like element 73 to the finger projection 61 and thereby the common potential of pattern 60.

Each of the strip-like elements 64 includes a diagonal leg, such as at 67, which positions the strip-like element one or two horizontal lines below its associated projection 62. This allows the switching element 65 time to act and the PLZT material time to stabilize as the beam 36 writes a prior horizontal line, which in NTSC format is approximately 64 microseconds per horizontal line. The transparent electrodes for this embodiment can be made from many materials, but preferably such are formed from indium tin oxide which exhibits excellent optical transparency and is compatible with the PLZT imaging plate.

The electro-optic material of the imaging plate can be many non-volatile materials including those which can be imaged and erased according to the methods of the invention. Preferably, electro-optic ceramics operated in the scattering mode are used because most of the energy from the specular image can be recovered and they can be used in the transmissive or reflective modes taught by the invention. As a working example, lead-lanthanum-zirconatetitinate (PLZT) formed from a mixture of 7.6–7.8 parts La by weight, 70 parts $ZrO_3$ by weight, and 30 parts $TiO_3$ by weight can be used because of its optical scattering characteristics. Compositions which increase scattering and provide high resolution are preferred. Sintering of the components produces a granular ceramic which has a grain structure surrounded by a matrix. The material has a phase transition at about 120° C. and is transparent at this condition.

In operation, the temperature controller 22 heats the imaging member to transparency and a potential, $V_b$, just below the transition voltage of the imaging plate 54 is applied between the front electrode 52 and the common pattern 60 of the back electrode 56 by power supply 24. The imaging member 12 is then completely erased by scanning the electron beam 36 over the switching elements 65 to erase the imaging plate 54 line-by-line. This initializes the imaging plate 54 on a completely line-by-line basis to a transparent, no image mode. After completion of the erasure, an image can be scanned onto the horizontal lines on the imaging plate by the electron beam 36 in a conventional manner, i.e., by a raster scan technique which sweeps the beam horizontally across the imaging plate to write one line of an image, retraces and then writes the next horizontal line. The process continues until the image raster is complete and an entire image has been written on the imaging plate 54. Vertical displacement of strip-like elements 64 allows the time between successive raster sweeps for the relatively high capacity (i.e., high Q) strip-like elements 64 to discharge the plate 54 to a no image mode.

Because the image is nonvolatile, there is no need to update it as often as with a conventional phosphor screen type cathode-ray tube. Further, because the image does not flicker an entire frame may be written with one raster scan instead of interlacing two fields. The frame rate at which the image is updated can be as low as the change in the image motion. Normally, the motion fusion rate for a video image is understood to be approximately 12 frames/sec. In addition, it is not necessary to erase the entire image and then rewrite it because the image is nonvolatile. Preferably, just before a particular line in the image is to be written in the raster, the strip-like element 64 which corresponds thereto is connected to the common pattern 60 to erase only that horizontal line. The line is rewritten by the electron beam 36 and the next strip-like element 64 in the back electrode 56 is connected to erase the next line.

This technique of single line erasure and rewrite advantageously ensures that around 99+% of the image, 523 or 524/525 lines for an NTSC format, are always viewable on the imaging plate 54 at any one time. The full erasure of an image and its rewrite would create a flicker in the video image which could be corrected only by techniques such as interlacing two related fields to form a frame and providing a frame rate far in excess of the motion fusion rate. The present invention reduces the necessary frame rate to 12 frames/sec., just in excess of the motion fusion rate, from the normal 30 frames/sec. This slower frame rate means a 60% reduction in signal bandwidth of the transmitted video signal without the necessity of a high framing rate to achieve flicker fusion.

Figure 7:
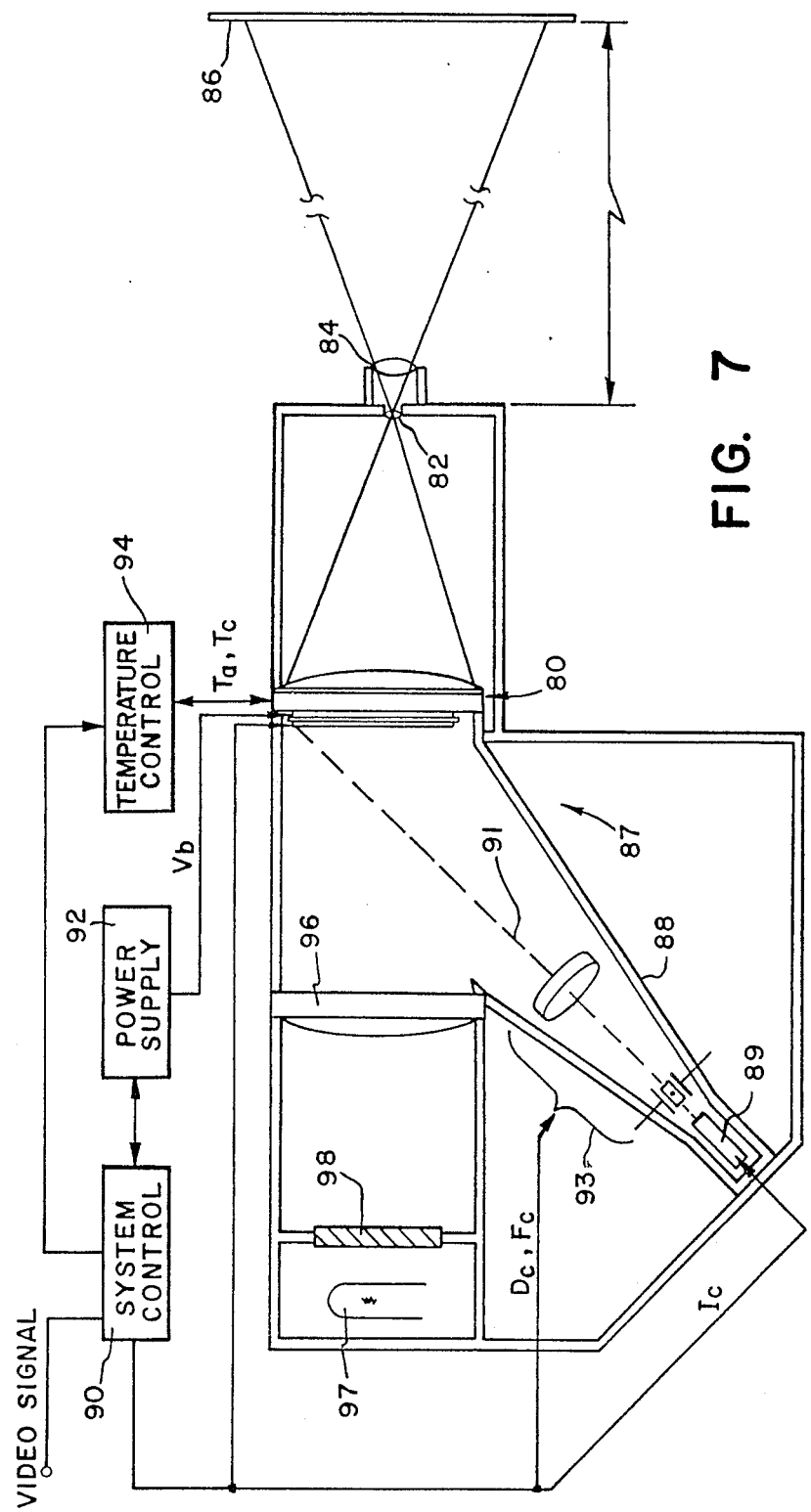
FIG. 7 is a cross-sectional system block diagram of a transmissive implementation of the first preferred embodiment of the optical projection system illustrated in FIG. 1.

The foregoing embodiment illustrates a reflective optical projection system where the illumination makes two transitions of the electro-optic imaging material. In FIG. 7, another implementation of this embodiment is shown where the illumination is transmitted through the PLZT imaging material and makes only one transit. This implementation will be termed a transmissive optical projection system. An imaging assembly 80, substantially similar to that illustrated in FIG. 1, is used to provide the generation of an image. The image is provided to a lens 82 which collects the specular image and emits substantially parallel light to a projection lens 84. The projection lens is at its focal length from, and projects the image upon a display screen 86. The collection lens 82 and the field lens of the imaging assembly 80 are at their focal lengths from each so that the transmitted light from the imaging assembly 80 emits parallel light from lens 82.

The significant difference between the imaging assemblies of the two implementations is that the imaging member of the transmissive embodiment does not have a mirror surface and light is transmitted through the PLZT plate instead being reflected off of a mirror surface on the back of the plate. The image formation is the same and is accomplished by scattering the transmitted illumination. The imaging assembly 80 is written by action of electron beam scanning and erased by an electrode potential in an identical manner as the reflective implementation.

The imaging assembly 80 forms a face plate for a cathode ray tube 87 having a vacuum envelope 88. The vacuum envelope 88 of the cathode ray tube is substantially cylindrical with the imaging assembly 80 forming a face plate on one end and a opposing optical flat and field lens assembly 96 forming a face plate on the other end. The envelope 88 of the cathode ray tube also includes a oblique neck containing a means for writing an image on the image assembly 80. The image writing means is, as for the last embodiment, an electron gun 89 which can be intensity modulated, and means 93 for deflecting the electron beam 91 with a focusing ring and parallel x,y deflection plates.

The identical system control 90 can be used to control a power supply 92 and a temperature control 94. The power supply 92 supplies the positive bias voltage Vb of approximately +300–600 volts which is used for erasure and the temperature control 94 maintains the optical flat of the imaging assembly 80 at a preset temperature where the imaging material is transparent. An illumination source 97 which can comprise a Xenon projection lamp is transmitted through a dichroic filter 98 which passes visible bandwidth illumination from the source and reflects unwanted radiation. The illumination is collected and transmitted through the optical-flat assembly 96 where it becomes parallel and continues through the imaging assembly 80 to form an image. The image for image assembly 80 is written by controlling the scanning of the electron beam 91 and its modulation. The erasure of the image is selective as was done in the first embodiment by the choice of a line-by-line erasure electrode by the scanning of the electron beam 91.

Thus, the reflective and the transmissive embodiments of the optical projection system operate quite similarly. It is noted because of the double passage of the illumination through the electro-optic medium of the reflective embodiment, however, that the contrast ratio will be greater for a reflective embodiment than for the transmissive embodiment, given imaging members of the same thickness. Further, because of the off axis deflection of the electron beam 91 in the transmissive embodiment, the spots for localized areas which are written (pixels) may be more elliptical than circular. However, if sufficient focusing and beam width dimensions are maintained, such will not be detrimental to the image quality provided in the final image.

There has been described for the preferred embodiment an electro-optic imaging member which in its quiescent state is transparent, which can be written with an electron beam to become opalescent to varying degrees in spots and can then be erased with a field applied between two electrodes. It is evident from the disclosure of the present application that other electro-optic imaging members could be used in the present optical projection system. The electro-optic imaging element can, as an alternative, comprise a material which is opalescent in the quiescent state and which turns transparent when written upon. Either of the disclosed imaging members can perform in this manner with or without temperature bias.

Moreover, the effect of becoming opalescent when transparent, or transparent when opalescent, is a physical phenomenon which is dependent upon the polarization of the grain domains, not the manner in which they become polarized. Thus, the electron beam can be used for writing or erasure of an image, as can the electrodes or other polarization sources. For example, the electron beams could strike either side of the imaging member setting up a writing field in one direction and an erasure field in the other. Even if configured to strike only one side of the imaging member, different relative field polarities may be induced to write and erase by the electron beam. The polarities of the electrodes depend upon the voltages applied and can either write or erase as the need arises. Particularly, if used for writing an image, the electrodes can take special shapes such as characters or symbols.

Other polarization means, such as lasers, ion beam generators, field effect generators, etc., can be used to either write or erase, or write and erase the imaging member. It is also well within the skill of the art to use any one of the aforementioned means either singly or in combination with any of the others.

Figure 8:
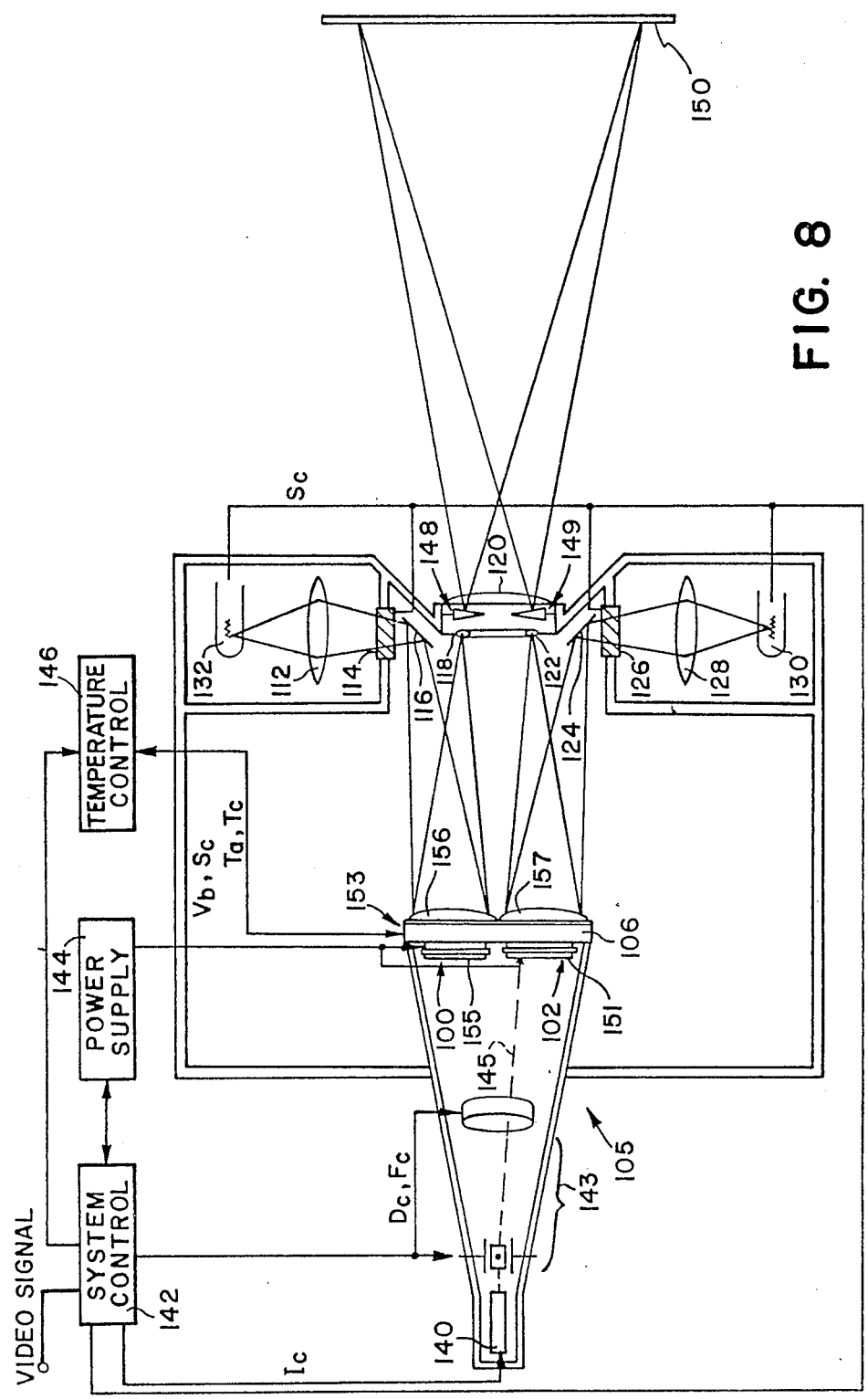
FIG. 8 is a cross-sectional system block diagram of a reflective implementation of a second preferred embodiment of an optical projection system constructed in accordance with the invention.

An alternative embodiment of the optical projection system 8, which will be termed for convenience a full erase implementation, is illustrated in FIGS. 8–11. In FIG. 8, an optical projection system is illustrated that utilizes an imaging assembly 153 including two electrooptic imaging members 100, 102 having mirror surfaces 155, 151, respectively. The imaging members 100, 102 are flexibly attached to an optical flat 106 acting as the face-plate of a cathode-ray tube 105, as better illustrated in FIGS. 9 and 10. The optical projection system 8 includes two illumination sources 130 and 132 which are preferably high wattage Xenon projection lamps, as in the first embodiment. The illumination sources 130, 132 have similar optics where condensing lenses 112, 128 focus the illumination from the sources on mirrors 116, 124. The illumination is reflected from mirrors 116, 124 through field lens 156, 157, optical flat 106 and imaging members 100, 102 to mirror surfaces 155, 151. The illumination then reflects from mirror surfaces 155, 151 to collecting lenses 118, 122 after being modulated by the images contained in the imaging members 100, 102. Field lenses 156, 157 have their focal lengths at lenses 118, 122, which in turn, have their focal lengths at imaging members 100, 102 so that all exiting light is parallel. Either of the images directed through lenses 118 and 122 can be further redirected by prism pair 148, 149 with their central rays parallel onto a projection lens 120. The projection lens 120 projects either of the images onto a screen 150.

Contained in the optical path of each illumination source 130, 132 is an optical window 114, 126 which can be made alternatively transparent and opalescent. Illumination source 132 transmits its illumination through optical window 114 when transparent while illumination source 130 transmits its illumination through optical window 126 when transparent. The system control 142 controls supplies a switching control signal Sc to make one window 114 opalescent while the other window 126 is transparent and, vice versa. This provides for the alternate display of the images from imaging members 100 and 102 on screen 150. It is evident that a convenient optical window for this system can be provided from the same electro-optic material as the imaging members 100 and 102. The system control 142 in the manner previously explained controls an electron gun 140 to write images on the imaging members 100, 102 with an electron beam 145. Control of the beam 145 is by deflection of the electrons with deflection system 143 which is controlled by the system control 142.

Figure 9:
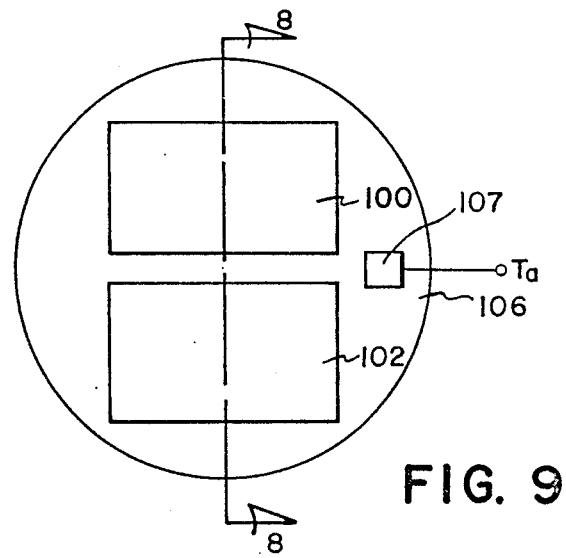
FIG. 9 is a front view of the imaging member of the cathode ray tube illustrated in FIG. 8.

In FIG. 9, the two imaging members 100, 102 are shown flexibly mounted on the back of the optical-flat 106. In addition, a temperature sensor 107 generating the signal Ta indicative of the actual temperature of the optical flat 106 is provided. The first imaging member 100 is flexibly bonded to the optical flat 106 and has front electrode 152 and back electrode 155 between which is a PLZT imaging plate 159, and the second imaging member 102 is flexibly bonded to the optical flat 106 and has front electrode 154 and back electrode 151 between which is a PLZT imaging plate 161. The electrodes 155, 151 are mirrored on the side of the plate 161 entered by the electron beam and serve as the mirror surfaces. The optical flat 106 is covered on its front surface with a resistive heating element 105 which is under control of the temperature control 146 via signal Tc. A bias voltage $V_b$ from power supply 144 is applied between the front electrode 152 and the back electrode 150 by closing a switch 158 and is applied between the front electrode 154 and the back electrode 151 by closing a switch 160. Any images stored in the imaging areas in plates 159, 161 are erased when the bias voltage Vb is applied between the respective electrodes. The switches 158 and 160 are under the control of system control 142 via control signal Sc which operates them in synchronism with the control voltage applied to the optical windows 114 and 126.

In operation, the image in imaging member 100 is fully erased by applying the bias voltage $V_b$ to its front and back electrodes. An image is then written into imaging member 100 by the electron beam 145 from the cathode gun 140. The image stored in imaging member 100 can then be displayed on screen 150 by opening optical window 114 to illuminate the imaging member with radiation from source 132. While the image from imaging member 100 is being displayed on screen 150, the imaging member 102 can be erased by applying the bias voltage $V_b$ between electrodes 151 and 154. Thereafter, an image subsequent in time to the one written into imaging member 100 is written into imaging member 102. At this point, optical window 114 is closed and optical window 126 opened to display the image from imaging member 102 on screen 150 while blocking the image from imaging member 100. Imaging member 100 is then erased as previously described and rewritten with the next image while optical window 114 is closed. The cycle repeats by displaying the new image from imaging member 100 on screen 150 while blocking the image from imaging member 102, erasing it, and rewriting the image area with the next image. Thus, alternating images are formed in the two image areas such that the system can operate at the motion fusion rate without flicker.

Figure 10:
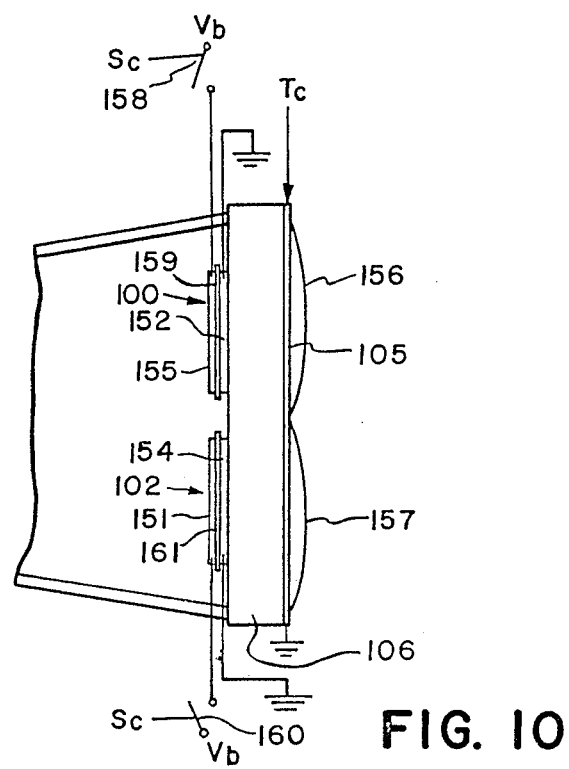
FIG. 10 is an enlarged cross-sectional view of the imaging assembly illustrated in FIGS. 8, 9 taken along section line 10—10 of FIG. 9.
Figure 11:
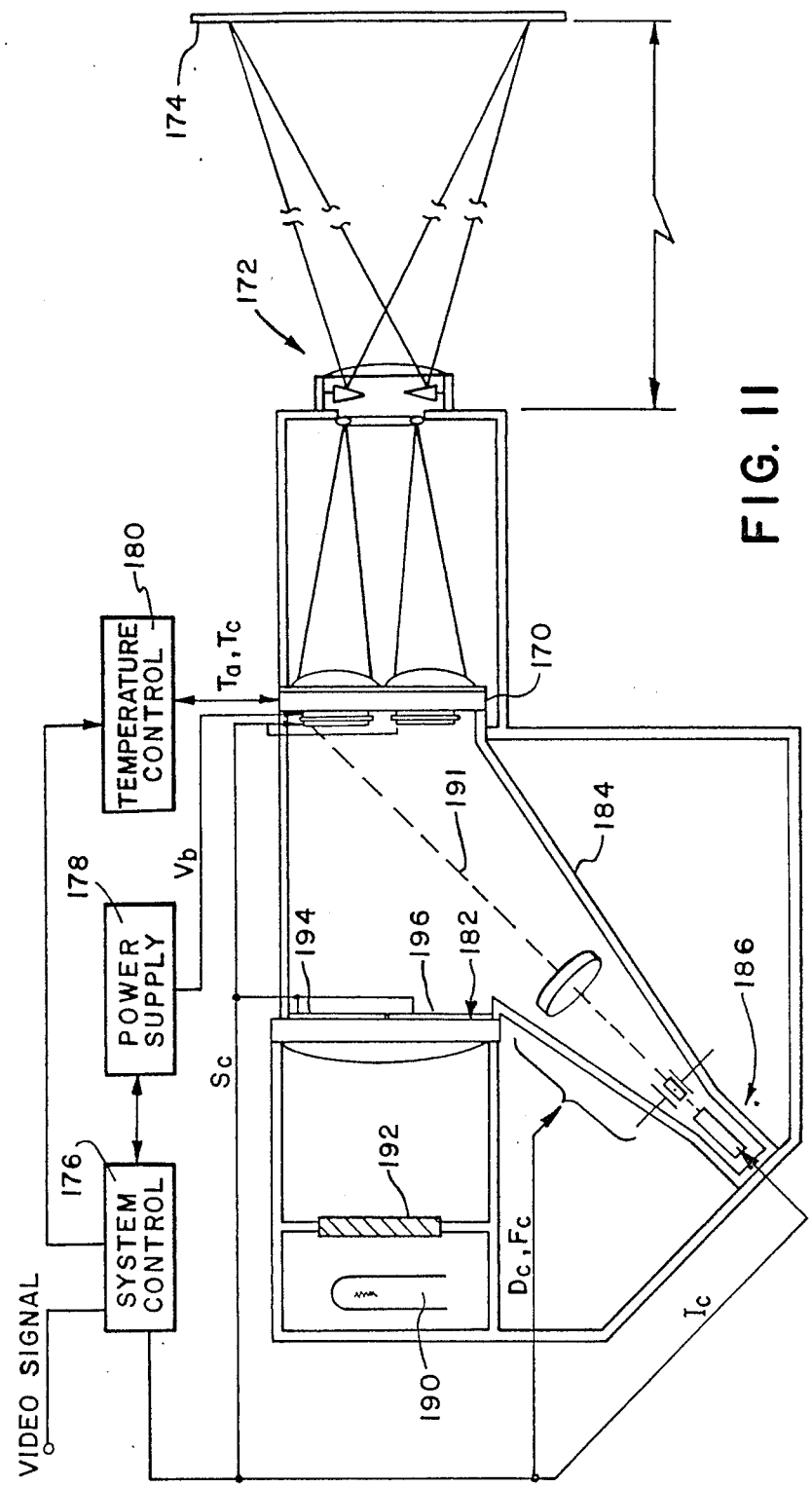
FIG. 11 is a cross-sectional system block diagram of a transmissive implementation of the second preferred embodiment of the optical projection system illustrated in FIG. 8.

FIG. 11 shows a transmissive implementation of the optical projection system illustrated in FIGS. 8-10. Imaging assembly 170 is substantially identical to the imaging assembly illustrated in more detail in FIG. 10. It contains two imaging members having full erase electrodes and an optical flat which forms the face plate of a cathode ray tube. Two field lenses focus the image off of each imaging member onto a projection optics assembly 172 which is substantially similar to the projection optics shown in FIG. 6.

The significant difference is that the back electrodes of the imaging members of imaging assembly 170 are not reflective but entirely transparent. The imaging assembly 170 forms one face plate of a cathode ray tube having a substantially cylindrical vacuum envelope 184. At the other end of the vacuum envelope 184, an optical flat assembly 182 provides an opposing face plate. The transmissive implementation includes an off-axis neck of the vacuum envelope 184 which contains the writing mechanism for the imaging assembly 170. The writing means 186 comprises a conventional electron gun for forming an electron beam 191, parallel x,y deflection plates and a focusing ring.

The optical projection system illustrated in FIG. 11 is controlled by a system control 176 which intensity modulates the writing means 186 with signal Ic and deflects beam 191 with signals Dc, Fc. The system control 176 further controls a power supply 178 and a temperature control 180. The power supply 178 provides a bias voltage Vb for erasing images on the imaging members of imaging assembly 170 and the temperature control 180 biases the optical flat of imaging assembly 170 to where the electro-optic material is transparent.

The imaging members of the imaging assembly 170 are illuminated in a transmissive mode by a single illumination source 190 which is filtered by dichroic filter 192 to provide a pass band of light in the visible spectrum. The light passes through the optical-flat assembly 182 and onto the imaging members of the imaging assembly 170. Optical windows 194 and 196, comprising electro-optic material, can be made selectively transparent and opalescent by means of the switching control signal Sc from the system control 176. Thus, the illumination from source 190 can be alternately controlled to be transmitted through either one image area or the other of imaging assembly 170. The system operates under the system control 176 where one image is displayed while the other image is being erased and rewritten thus removing flicker from the system.

The video signal for the optical projection system can be obtained from various sources and can be in any of the many formats in which such signals are encoded. The video signal may be obtained from over-the-air broadcasts, video tape, video disk, station feed, camera feed, etc. In any event, standard receiving equipment can be used to provide the video signal to the optical projection system. The optical projection system is adaptable to any conventional format of video signal which can be imaged by a cathode-ray tube display including NTSC, PAL, SECAM, RGB, XY, etc. Bit mapped and graphical images are additionally useable with such system. Conventional decoding electronics and scanning techniques are directly useable in the system control to modulate the electron beams(s) (intensity or otherwise) and scan the beam(s) with the deflection means.

Without limiting the invention, the first embodiment is more readily suited for raster scan video formats which operate on a line-by-line basis while the second embodiment is more readily suited for graphical imaging and bit mapped formats. Because the system does not exhibit flicker, other nonstandard video signals at the motion fusion rate can be displayed while still retaining compatibility with standard signals. With these and the other aforementioned advantages of the optical projection system, the apparatus in its several embodiments is an excellent platform for new formats, such as high definition television or others to be developed in the future.

The first two embodiments can be characterized as monochromatic or black and white type systems, where white light illumination is modulated by areas of varying opalescence to produce an image formed of varying intensities of grey level. This monochromatic system has been illustrated in the first embodiment as a line-by-line erase system and in the second embodiment as a full image erase system. In the third preferred embodiment, illustrated in FIGS. 12-16, a color optical projection system will be illustrated. The illustrated color system uses the line-by-line erase technique of the first preferred embodiment.

Figures 12, 16:
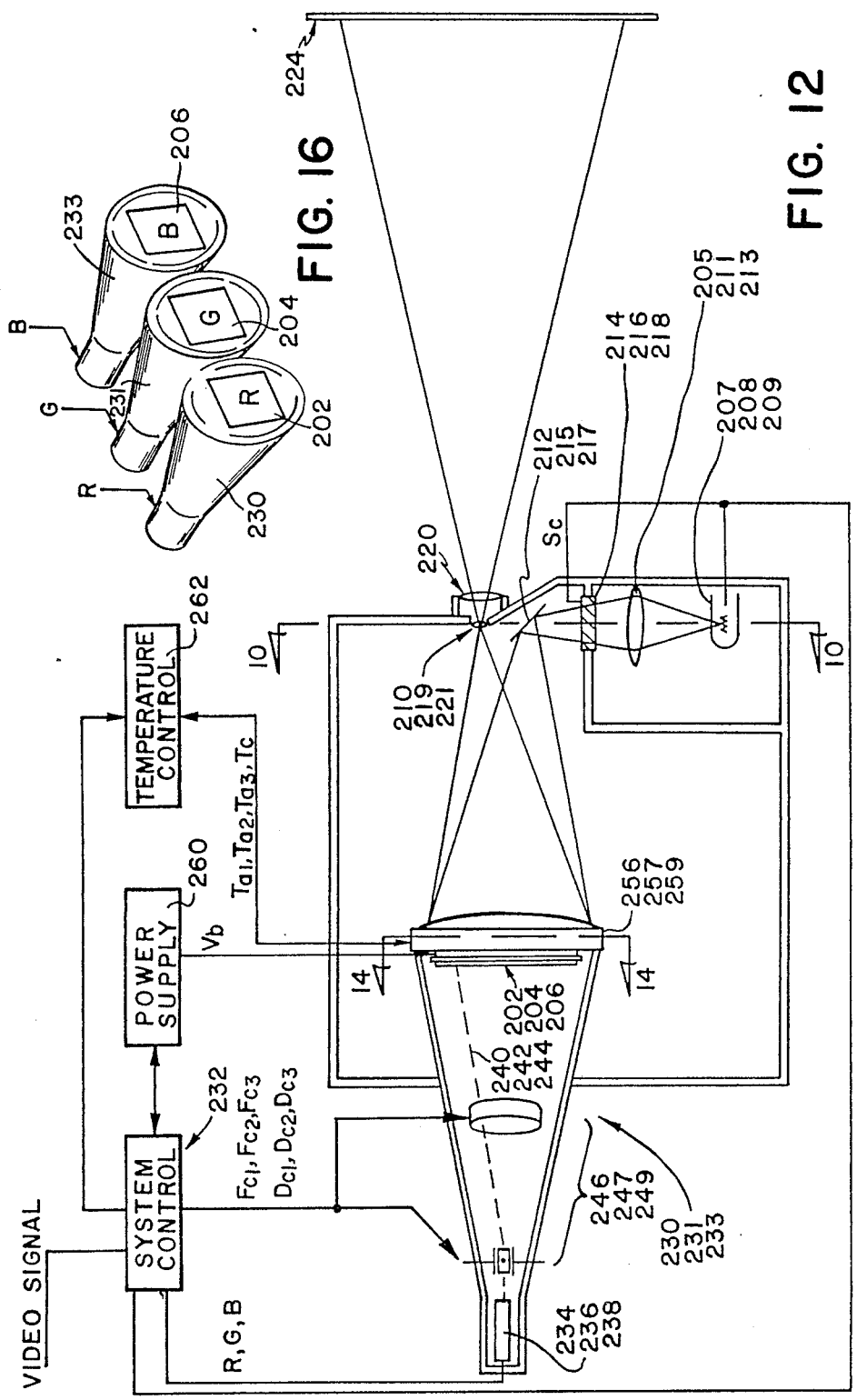
FIG. 12 is a cross-sectional system block diagram of a reflective implementation of a third preferred embodiment of an optical projection system constructed in accordance with the invention.
FIG. 16 is a perspective view of the cathode-ray tubes of the optical projection system illustrated in FIG. 12.
Figure 13:
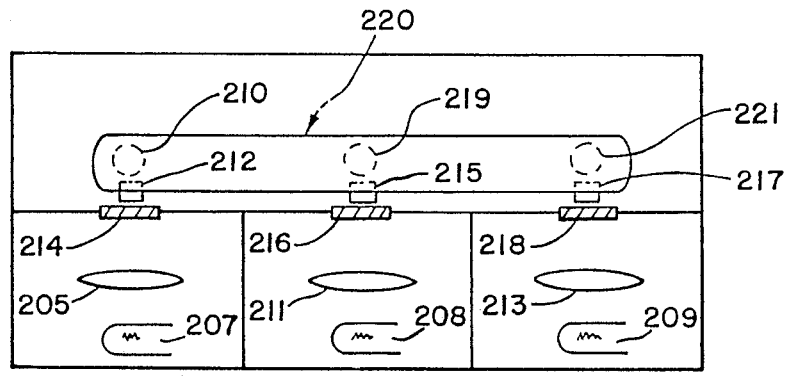
FIG. 13 is a cross-sectional front view of the illumination sources and projection optics of the optical projection system illustrated in FIG. 12.

An optical projection system having these attributes is shown in FIGS. 12, 16 wherein three separate imaging members 202, 204 and 206 are illustrated flexibly bonded to the face plates of three parallel positioned cathode-ray tubes 230, 231, 233. The cathode ray tubes, their illumination sources, and projection optics are identical in construction except for dichroic filters 214, 216 and 218. The imaging members 202, 204 and 206 are reflective in nature, as described for the previous implementation of FIG. 1, and include front and back electrodes of the line-by-line erase structure.

The optical projection system includes three illumination sources, 207, 208, 209, one for each cathode ray tube, the radiation from which is condensed in lenses 205, 211 and 213, and focused on mirrors 212, 215 and 217, before being reflected onto the imaging members 202, 204, and 206, respectively. Each of the imaging members 202, 204 and 206 reflects the illumination which has been filtered through the individual dichroic filters 214, 216 and 218, respectively to collection lens 210, 219, 221. The purpose of the placement of the dichroic filters 214, 216 and 218 at the exits of the illumination boxes is to permit only a narrow band width of illumination to reach the imaging members, thereby forming a primary color and limiting any heating effect in the PLZT of the imaging members. The parallel light transmitted through lenses 210, 219 and 221 is optically combined in a projection lens sector 220 which focuses a color composite image on screen 224.

As was the case for the previous embodiments, the imaging members 202, 204, 206 are attached to and inside the face plates of cathode ray tubes 230, 231, 233 which are under the control of system control 232. The system control 232 provides a series of a video signals R, G, B to modulate the intensity of the electron beams output from electron guns 234, 236 and 238. The electron guns produce electron beams 240, 242 and 244 which are controlled by the system control 232 with deflection systems 246, 247, 249 in a conventional manner. Each one of the electron beams is intensity modulated by one of the R, G, B signals and carries one separate primary color image component for a particular image.

Thus, when a standard R, G, B color video signal is applied to guns 234, 236 and 238, separate monochromatic primary color images are written in imaging members 202, 204 and 206, respectively. The monochromatic images are illuminated with the white light of sources 207, 208, 209 filtered by dichroic filters 214, 216, 218, and focused on their respective projector lenses 210, 219, 221. Each of the images after being written and illuminated produces a monochromatic image of its particular primary color. For example, the image written on imaging member 202 from the R component signal would be illuminated through dichroic filter 214 which produces a red monochromatic image output by transmitting only that frequency from the incident white light. Likewise, dichroic filter 216 which illuminates imaging member 204 will have passed only a monochromatic signal with a green frequency bandwidth, while dichroic filter 218 will have passed only monochromatic blue light. The monochromatic images can then be combined by additive color combination in the projection lens sector 220 to form a composite color image on screen 224.

Figure 14:
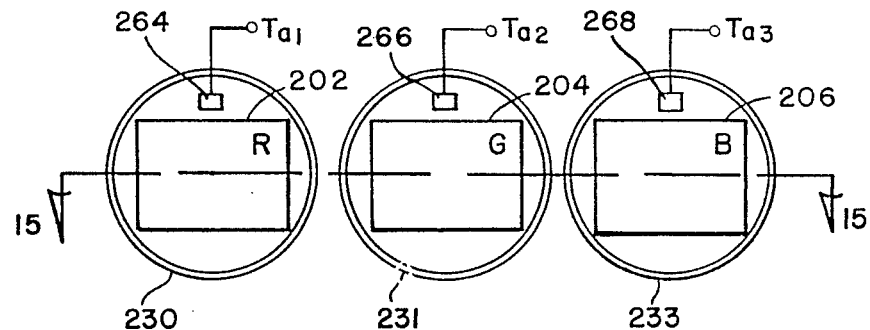
FIG. 14 is a cross-sectional front view of the imaging members for the system illustrated in FIG. 12.
Figure 15:
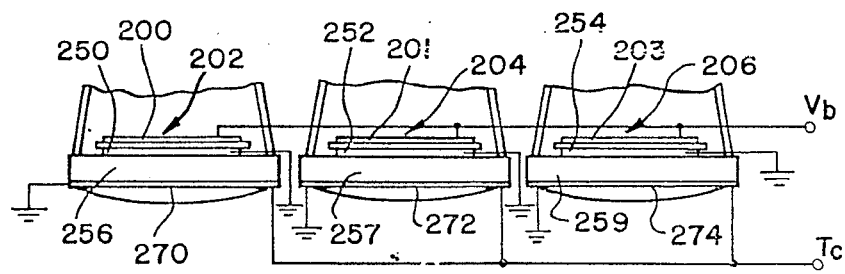
FIG. 15 is a cross-sectional view of the imaging members illustrated in FIG. 14 and taken along section line 15—15 of that figure.

As better seen in FIGS. 14 and 15, the imaging members 202, 204, 206 include front electrodes 250, 252 and 254 flexibly mounted on optical-flats 256, 257, 259, respectively. The front electrodes 250, 252 and 254 substantially cover the imaging members 202, 204, 206. On the back of the imaging members 202, 204, 206 are back electrodes 200, 201, 203 which correspond to the areas of the front electrodes. The back electrodes 200, 201, 203 are formed of same pattern of finger projections and elongated strip-like elements as the line-by-line erase electrodes illustrated for the embodiment of FIG. 1. A bias voltage $V_b$ is applied between the front electrodes 250, 252 and 254 and the back electrodes 200, 201 and 203 to provide a means for erasing single lines of an image in the PLZT imaging plates when one of the switching elements is closed by the electron beams 240, 242, 244.

The third embodiment, therefore, uses three of the basic reflective line-by-line erase systems illustrated for the first embodiment. It could use the transmissive line-by-line erase systems. Each system is imaged by a separate primary color signal and illuminated with a different primary color of illumination. The composite color signal is a simple, but elegant, additive combination of the three separate images. While this color system is straight forward, it will be appreciated that more complex cathode-ray tubes could be built where the three imaging members were formed on the face plate of one cathode-ray tube, or a single imaging member written and illuminated in three different areas. It is also evident the subtractive, or other color composites can be made using the teachings of the invention.

A fourth embodiment of the invention is illustrated in FIGS. 17-21. The fourth embodiment is a combination of the second and third embodiments, and as such, can be characterized as a color optical projection system using the full erase feature. The fourth embodiment, therefore, uses three of the basic full erase systems illustrated for the reflective implementation of the second embodiment. It could, however, use three of the transmissive implementations of the second embodiment. Each system is imaged by a separate primary color signal and illuminated with a different primary color of illumination. Each cathode-ray tube has two levels, where one level can be displayed while the other is being erased and rewritten. The composite color signal is a simple, but elegant, additive combination of the three separate images for one level.

In FIGS. 17 and 21, imaging members 300, 301; 307, 309; 311, 313 are flexibly bonded onto the imaging assemblies 372, 374, 376 forming the face plates of cathode-ray tubes 302, 303, 305 having three color guns 304, 306, 308. The three color guns 304, 306, 308 are controlled by a system control 310 with image modulated signals R, G, and B. The signals R, G, and B correspond to the primary color image components of a composite color video image and intensity modulate the electron beams from the guns. The electron beams from guns 304, 306 and 308 can be scanned onto the separate image areas of imaging members 300, 301; 307, 309; and 311, 313, respectively, by means of deflection and focus assemblies 312, 315, 317. The system control 310 further controls a power supply 314 for biasing the imaging members and a temperature control 316 which connects to the imaging assemblies of the cathode-ray tubes to maintain their temperature.

Figure 19:
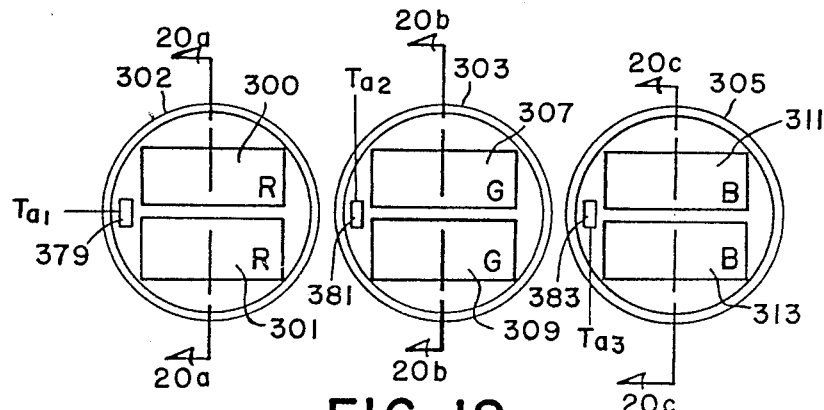
FIG. 19 is a cross-sectional front view of the imaging members illustrated in FIG. 18.

The imaging members 300, 301; 307, 309; and 311, 313 are more clearly shown in FIG. 19 which shows a back view of the imaging assemblies of cathode-ray tubes 302, 303, 305. There are six imaging areas which are cover substantially the front faces of tubes 302, 303, 305. The imaging areas of imaging members 300, 307, 311 form a first imaging level and the imaging areas for imaging members 301, 309, 313 form a second imaging level. Each of the imaging assemblies also includes temperature sensors 379, 381, 383, which generate signals Ta1, Ta2, Ta3, which are indicative of the actual temperature of the respective assemblies.

Figure 18:
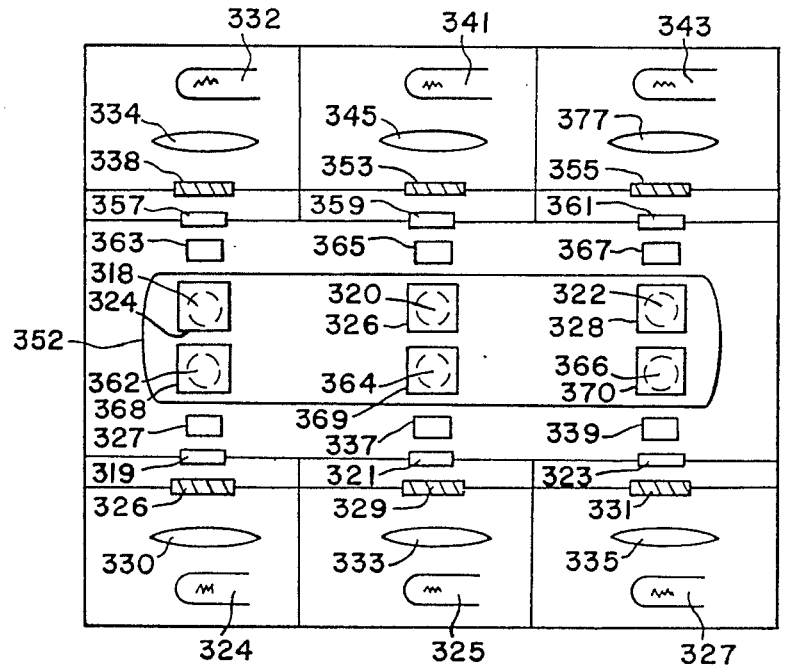
FIG. 18 is a cross-sectional front view of the illumination sources and projection optics of the system illustrated in FIG. 17 taken along section line 18—18 of that figure.

Returning to FIG. 17 in conjunction with FIG. 18, the image areas of the first level are illuminated by sources 332, 341, 343 which project monochromatic light through R, G, B dichroic-filters 338, 353, 355 after being condensed by lenses 334, 345, 377. The illumination is then gated through PLZT optical windows 357, 359, 361 operating as light valves, to, and reflects off of, mirrors 363, 365, 367 and onto the first imaging level. In a similar manner, sources 324, 325, 327 have their illumination condensed by lenses 330, 333, 335 and focused on mirrors 327, 337, 339 through R, G, B dichroic filters 326, 329, 331. The illumination for the second level is switched on and off by PLZT optical windows 319, 321, 323, and is reflected off the mirrors onto the second imaging level.

The first level of image areas reflects its three images in focus on lenses 318, 320, 322, and thence through prisms 324, 326, 328 to render the central rays of the first image level parallel. The second level of image areas reflects its three images in focus on lens 362, 364, 366, and thence through prisms 368, 369, 370 to render the central ray of the second image level parallel. Inasmuch as lenses 318, 320, 322; 362, 364, 366 are at their focal lengths from PLZT imaging members 300, 307; 311; 301, 309, 313, respectively all light beams can be focused on screen 356 by a single lens segment, collimating lens 352, which is at its focal length from the screen 356. Light pipes from a single source can be used to substitute for illumination sources 324, 325, 327 and 332, 341, 343.

Figure 20:
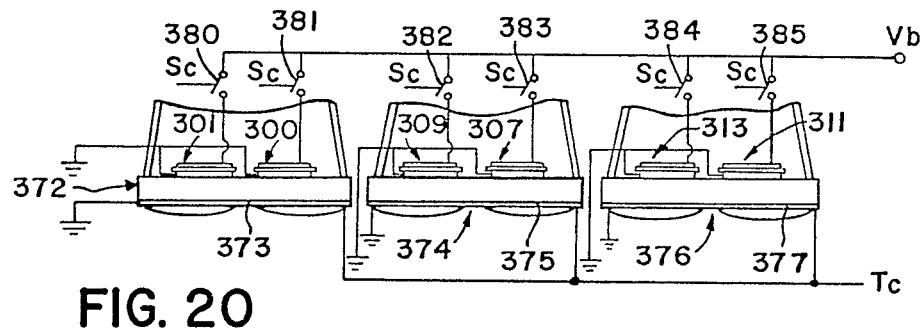
FIG. 20 is a cross-sectional view of the imaging members illustrated in FIG. 19 taken along section lines 20a—20a, 20b—20b, 20c—20c of that figure.

FIG. 20 illustrates the imaging assemblies 372, 374, 376 of cathode-ray tubes 302, 303, 305 have the same structure as the assembly illustrated in FIG. 10. Each assembly comprises an optical-flat, two imaging members, and corresponding field lens. The assemblies 372, 374, 376 further include resistive heating electrodes 373, 375, 377 imprinted on the front surface of the optical-flats which are commonly connected to the temperature control signal Tc from system control 310. The back electrode of the imaging members 301, 300, 309, 307, 313, 311 are connected through switches 380, 381, 382, 383, 384, 385 to the bias voltage Vb. The switching control signal Sc from the system control 310 to provide selective full erasure for individual imaging members.

In operation, for initialization purposes, all optical windows 319, 321, 323 and 357, 359, 361 are closed. The first imaging level including imaging members 300, 307, 311 are fully erased by closing switches 381, 383, 385. The first level is then written with three separate color component images R, G and B which form the separate primary color portions of a composite color image. This image is then displayed by opening windows 357, 359, 361 thereby illuminating it with sources 332, 341, 343. The three separate color images are additively combined and projected by lens 352 onto screen 356. At the time of display for the first level, optical windows 319, 321, 323 are closed and the second level images are fully erased by closing switches 380, 382, 384. After erasure, the three imaging members 301, 309, 313 of the second level are written with the R, G and B images following serially after those which were written on the first level. At the motion fusion rate, optical windows 357, 359, 361 are closed and simultaneously, optical windows 319, 321, 323 are opened to illuminate the second level with sources 324, 325, 327. This produces a display of the combination color image on screen 356 from the second level. While this is occurring, the first level can be erased and rewritten with a new image and the cycle continued.

While the preferred embodiments of the invention have been illustrated, it will be obvious to those skilled in the art that various modifications and changes may be made thereto without departing from the spirit and scope of the invention as hereinafter defined in the appended claims.

What is claimed is:

1. An optical projection system for displaying a visible image on a screen, said system comprising:
   a reflective imaging member of the electro-optic type in the shape of a surface including a multiplicity of strip-like reflecting elements arranged thereon in the shape of said surface to form a mirror;
   an illumination source for irradiating said reflective imaging member with radiation of an intensity and wavelength which will pass through the member and will be reflected from the mirror of said reflective imaging member in a visible manner;
   means for writing an image in said reflective imaging member which changes the opalescence of certain areas of the member such that the areas modulate the scattering of said illuminating radiation being reflected from said mirror;
   means for selectively controlling said strip-like elements to modify the portion of the image written by said image writing means which corresponds to the area of an individual element; and means for displaying the reflected image from said reflective imaging on the screen.

2. An optical projection system as set forth in claim 1 wherein said reflective imaging member comprises:

a thin plate of electro-optic material which is substantially transparent when not influenced by an electrical field and which can be made opalescent in varying degrees by applying an electrical field, said plate having a illumination receiving side and a reflecting side;

a transparent electrode on said receiving side;

said strip-like elements being formed on said reflecting side and forming a complementary electrode to said transparent electrode on said receiving side; and wherein said means for controlling said elements applies a voltage across said transparent electrode and selectable elements of said multiplicity of strip-like elements to modify the opalescence of the area of said plate between the selected element and the transparent electrode.

3. An optical projection system as set forth in claim 2 wherein said means for writing an image includes;

an electron beam generator which generates an electron beam which impinges on said area of said plate to change its opalescence in those areas;

means for scanning the electron beam of said beam generator over said plate in a controlled fashion; and means for modulating the intensity of said electron beam with image information such that the degree of opalescence of the areas of said plate impinged on by said beam corresponds to the intensity.

4. An optical projection system as set forth in claim 3 wherein said scanning means includes:

means to scan said electron beam in a raster pattern corresponding to said arrangement of said strip-like elements.

5. An optical projection system for displaying a visible image on a screen, said system comprising:

a transmissive imaging member of the electro-optic type in the shape of a surface including a multiplicity of strip-like electrode elements arranged thereon in the shape of said surface;

an illumination source for irradiating said image transmitting member with radiation of an intensity and wavelength which will be transmitted through said transmissive imaging member in a visible manner;

means for writing an image in said image transmissive imaging member which changes the opalescence of certain areas of the member such that the areas modulate the scattering of said illuminating radiation being transmitted through the member;

means for selectively controlling said strip-like elements to modify the portion of the image written by said image writing means which corresponds to the area of an individual element; and means for displaying the transmitted image from said transmissive imaging member onto the screen.

6. An optical projection system as set forth in claim 5 wherein said transmissive imaging member comprises:

a plate of electro-optical material which is substantially transparent when not influenced by an electrical field and which can be made opalescent in varying degrees by applying an electrical field, said plate having an illumination receiving side and a transmitting side;

a transparent electrode on said transmitting side;

said strip-like elements being formed on said receiving side and forming a complementary electrode to said transparent electrode on said transmitting side; and wherein said means for controlling said elements applies a voltage across said transparent electrode and selectable elements of said multiplicity of strip-like elements to modify the opalescence of the area of said plate between the selected element and the transparent electrode.

7. An optical projection system as set forth in claim 6 wherein said means for writing an image includes;

an electron beam generator which generates an electron beam which impinges on said image area of said plate to change its opalescence in those areas;

means for scanning the electron beam of said beam generator over said plate in a controlled fashion; and means for modulating the intensity of said electron beam with image information such that the degree of opalescence of the areas of said plate impinged on by said beam corresponds to the intensity.

8. An optical projection system as set forth in claim 7 wherein said scanning means includes:

means to scan said electron beam in a raster corresponding to said arrangement of said strip-like elements.

9. An optical projection system for displaying a visible image on a screen, said system comprising:

a reflective imaging member of the electro-optic type in the shape of a surface including a reflecting element arranged thereon in the shape of said surface to form a mirror;

an illumination source for irradiating said reflective imaging member with radiation of an intensity and wavelength which will pass through the member and will be reflected from the mirror element of said reflective imaging member in a visible manner;

means for writing an image in said reflective imaging member which changes the opalescence of certain areas of the member such that the areas modulate the scattering of said illuminating radiation being reflected from said mirror element;

means for controlling said reflecting element to erase the image written by said image writing means which corresponds to the area of said mirror element; and means for displaying the reflected image from said reflective imaging member on to the screen.

10. An optical projection system for displaying a visible image on a screen, said system comprising:

a reflective imaging member including a first reflecting element forming a first mirror and a second reflecting element forming a second mirror;

a first illumination source for irradiating said first reflecting member with radiation of an intensity and wavelength which will pass through the member and will be reflected from said first mirror in a visible manner;

a second illumination source for irradiating said second reflecting member with radiation of an intensity and wavelength which will pass through the member and will be reflected from said second mirror in a visible manner;

means for writing a first image on said reflective imaging member in a first image area corresponding to said first reflecting element and for writing a second image on said reflecting element in a second image area corresponding to said second reflective imaging member, said writing means changing the opalescence of certain areas of the member such that the areas modulate the scattering of said illuminating radiation being reflected from said first and second reflecting elements;

means for controlling said first and second reflecting elements to erase the images written by said image writing means in said first and second image areas;

means for displaying the reflected images from said first and second reflecting members on to the screen; and system control means for controlling said first and second illumination means, said writing means, and said first and second erasing means to display one of the first and second images while erasing and writing the other.

11. An optical projection system for displaying a visible image on a screen, said system comprising:

a transmissive imaging member of the electro-optic type in the shape of a surface including a first electrode element forming a first imaging area and a second electrode element forming a second imaging area;

a first illumination source for irradiating said first image area with radiation of an intensity and wavelength which will be transmitted through said transmissive imaging member in a visible manner;

a second illumination source for irradiating said second image area with radiation of an intensity and wavelength which will be transmitted through said transmissive imaging member in a visible manner;

means for writing a first image on said imaging member in said first imaging area corresponding to said first electrode element and for writing a second image on said imaging member in said second imaging area corresponding to said second electrode element, said writing means changing the opalescence of certain areas of the member such that the areas modulate the scattering of said illuminating radiation being transmitted through said first and second imaging areas;

means for controlling said first and second electrode elements to erase the images written by said image writing means in said first and second imaging areas;

means for displaying the images transmitted through said first and second imaging areas onto the screen; and system control means for controlling said first and second illumination means, said writing means, and said first and second erasing means to display one of said first and second images while erasing and writing the other.

12. An optical projection system for displaying a visible image on a screen, said system comprising:

reflective imaging members of the electro-optic type in the shape of a surface including a first reflecting element, a second reflecting element, and a third reflecting element arranged thereon in the shape of said surface to form a first mirror, a second mirror, and a third mirror;

illumination sources for irradiating said reflective imaging members with radiation of an intensity and wavelength which will pass through said member and will be reflected from said first, second and third mirror elements in a visible manner;

means for writing a color image on said imaging members in said first, second and third image areas which changes the opalescence of certain areas of the member such that the areas modulate the scattering of said illuminating radiation being reflected from said first second and third reflecting elements, said color image forming three primary color images in said first, second and third imaging areas;

means for controlling said first, second and third reflecting elements to erase the images written by said image writing means in said first, second and third imaging areas;

means for combining the reflected images from said first, second, and third reflecting elements into a composite color image; and means for displaying said composite color image on to the screen.

13. An optical projection system for displaying a visible image on a screen, said system comprising:

transmissive imaging members in the shape of a surface including a first electrode element, a second electrode element, and a third electrode element arranged thereon in the shape of said surface to form a first imaging area, a second imaging area, and a third imaging area;

illumination sources for irradiating said imaging members with radiation of an intensity and wavelength which will be transmitted through said first, second, and third imaging areas of said imaging members in a visible manner;

means for writing a color image on said imaging members in said first, second and third imaging areas which changes the opalescence of certain areas of the members such that the areas modulate the scattering of said illuminating radiation being transmitted through said first, second, and third imaging areas, said color image forming three primary color images in said first, second and third image areas;

means for controlling said first, second and third electrode elements to erase the image written by said image writing means in said first, second and third imaging areas;

means for combining the transmitted images from said first, second, and third imaging areas into a composite color image; and means for displaying said color composite image on to the screen.

14. An optical projection system for displaying a visible image on a screen, said system comprising:

reflective imaging members of the electro-optic type in the shape of a surface including a first set of reflecting elements to form a first level of mirrors and a second set of reflecting elements to form a second level of mirrors;

first illumination sources for irradiating said first set of reflecting members with radiation of an intensity and wavelength which will pass through said member and will be reflected from said first level of mirror elements of said reflective members in a visible manner;

second illumination sources for irradiating said second set of reflecting members with radiation of an intensity and wavelength which will pass through said members and will be reflected from said second level of mirror elements of said reflective members in a visible manner;

means for writing a first color image on said reflective members in said first level of imaging areas corresponding to said first set of reflecting elements and for writing a second color image on said reflective members in said second level of imaging areas corresponding to said second set of reflecting elements;

said writing means changing the opalescence of certain areas of the members such that the areas modulate the scattering of said illuminating radiation being reflected from said first and second sets of reflecting elements;

means for controlling said first and second sets of reflecting elements to erase the color images written by said image writing means in said first and second levels of image areas;

means for combining said images from said first level into a first color composite image and for combining said images from said second level into a second composite color image;

means for displaying the reflected composite color images from said first and second levels onto the screen; and system control means for controlling said first and second illumination sources, said writing means, and said first and second sets of erasing means to display one of the first and second color images while erasing and writing the other.

15. An optical projection system for displaying a visible image on a screen, said system comprising:

transmissive imaging members of the electro-optic type in the shape of a surface including a first set of electrode elements to form a first level of imaging areas and a second set of electrode elements to form a second level of imaging areas;

first illumination sources for irradiating said first set of electrode elements with radiation of an intensity and wavelength which will be transmitted through said first level of imaging areas of said transmissive members in a visible manner;

second illumination sources for irradiating said second set of electrode elements with radiation of an intensity and wavelength which will be transmitted through said second level of imaging areas of said transmissive members in a visible manner;

means for writing a first color image on said transmissive members in said first level of imaging areas corresponding to said first set of electrode elements and for writing a second color image on said transmissive members in said second level of imaging areas corresponding to said second set of electrode elements;

said writing means changing the opalescence of certain areas of the members such that the areas modulate the scattering of said illuminating radiation being transmitted through said first and second levels of imaging areas;

means for controlling said first and second sets of electrode elements to erase the color images written by said image writing means in said first and second levels of imaging areas;

means for combining said images from said first level into a first color composite image and for combining said images from said second level into a second composite color image;

means for displaying the transmitted composite color images from said first and second levels onto the screen; and system control means for controlling said first and second illumination sources, said writing means, and said first and second sets of erasing means to display one of the first and second color images while erasing and writing the other.

16. An optical projection system for displaying a visible image on a screen, said system comprising:

reflective imaging members of the electro-optic type in the shape of a surface including a first reflecting element, a second reflecting element, and a third reflecting element arranged thereon in the shape of said surface to form a first mirror, a second mirror, and a third mirror, said reflecting elements each being formed of a multiplicity of strip-like elements arranged in generally parallel rows;

illumination sources for irradiating said reflective members with radiation of an intensity and wavelength which will pass through the member and will be reflected from said first, second and third mirror elements of said reflective members in a visible manner;

means for writing a color image on said reflective members in said first, second and third imaging areas which changes the opalescence of certain areas of the member such that the areas modulate the scattering of said illuminating radiation being reflected from said first second and third reflecting elements, said color image forming three primary color images in said first, second and third imaging areas;

means for controlling said first, second and third reflecting elements to erase the images written by said image writing means in said first, second and third imaging areas, said means for controlling including means for selectively controlling said strip-like elements to modify a portion of the respective imaging areas which correspond to the area of an individual strip-like element;

means for combining the reflected images from said first, second, and third reflecting elements into a composite color image; and means for displaying said color composite image on to the screen.

17. An optical projection system for displaying a visible image on a screen, said system comprising:

transmissive imaging members of the electro-optic type in the shape of a surface including a first electrode element, a second electrode element, and a third electrode element arranged thereon in the shape of said surfaces to form a first imaging area, a second imaging area, and a third imaging area, said electrode elements each being formed of a multiplicity of strip-like elements arranged in generally parallel rows;

illumination sources for irradiating said image transmitting member with radiation of an intensity and wavelength which will be transmitted through said first, second and third imaging areas of said imaging member in a visible manner;

means for writing a color image on said image transmissive imaging member in said first, second and third imaging areas which changes the opalescence of certain areas of the members such that the areas modulate the scattering of said illuminating radiation being reflected from said first second and third reflecting elements, said color image forming three primary color images in said first, second and third imaging areas;

means for controlling said first, second and third electrode elements to erase the image written by said image writing means in said first, second and third imaging areas, said means for controlling including means for selectively controlling said strip-like elements to modify a portion of the respective imaging areas which correspond to the area of an individual strip-like element;

means for combining the reflected images from said first, second, and third electrode elements into a composite color image; and means for displaying said color composite image on to the screen.

* * * * *